Patented June 25, 1940

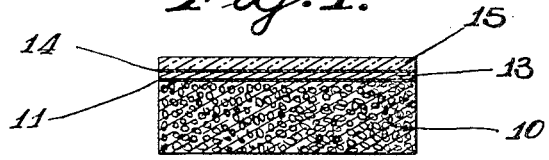
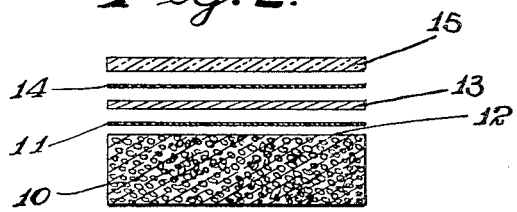
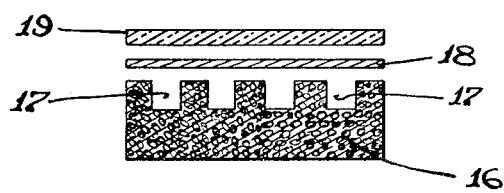
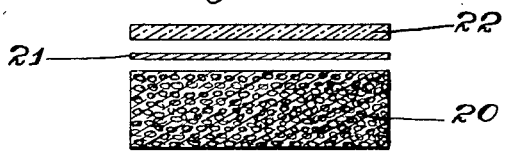

2,205,534

UNITED STATES PATENT OFFICE 2,205,534

COMPOSITE CELLULAR GLASS BLOCK

William O. Lytle, New Kensington, Pa., assignor to Pittsburgh Plate Glass Company, Allegheny County, Pa., a corporation of Pennsylvania Application June 4, 1938, Serial No. 211,883

6 Claims. (Cl. 72—37)

The present invention relates to building units and more particularly to a cellular glass sheet or block having a layer of decorative glass on one surface thereof and an interposed layer of water-impervious material protecting the surface of the cellular glass sheet or block.

The primary object of my invention is to provide means for protecting porous outer surfaces of cellular glass blocks or sheets from penetration by water vapor and moisture when an outer facing or veneer on said blocks is broken or punctured.

Another object of my invention is the creation of an inexpensive structural unit having the desirable properties of strength per unit area, although of relatively light weight and possessing thermal and sound insulating characteristics, while presentng unusual qualities of durability against deleterious agencies effective upon ordinary materials.

These and other objects will be apparent from consideration of the following specification and claims in conjunction with the accompanying drawing, wherein:

Figure 1 is a cross-sectional view of a building unit in assembled form embodying my invention;

Figure 2 is a similar view of the product shown in Figure 1 in unassembled form of the invention;

Figure 3 is a similar view of a modification of the invention; and

Figure 4 is a similar view of a still further modification of the invention.

It has heretofore been proposed to employ blocks as structural units consisting of cellular glass having a porous outer surface and possessing relatively low thermal conductivity and high resistance to decomposition by heat. The outer porous surface of the cellular glass blocks was then protected by applying thereto a sheet of non-porous vitreous material, such as decorative glass. However, when this covering sheet or veneer material became broken or punctured, water could readily penetrate into the body of the block. In such case the block not only would lose some of its insulating effect, but it would also disintegrate when frozen.

The present invention is based upon the discovery that the foregoing difficulties may be substantially obviated by adhering a sheet of metal or water-impervious plastic material to the porous surface of the cellular glass block between the block and an outer sheet of non-porous, vitreous material.

Referring to Figures 1 and 2, a block 10 of cellular glass has a sheet 11 of a suitable non-shatterable plastic material, such as an incompletely polymerized vinyl acetal resin, or an incomplete phenol formaldehyde resin applied upon its outer surface 12. A sheet of thin metallic foil 13, of any desired metal such as aluminum or copper, is then placed upon the surface of the plastic sheet. Another sheet of plastic material 14, preferably of the same composition as sheet 11, is interposed between the other surface of foil sheet 13 and the inner surface of a sheet of non-porous, vitreous material 15. The entire assembly may then be united by placing it in a suitable mold where it is heated to a temperature of about 200° F. and subjected to pressure. Under the influence of the heat and pressure, the plastic sheets 11 and 14 are softened and become somewhat tacky so that they cement the sheet of foil 13 and the sheet of vitreous material 15 to the surface of the block 10 of cellular glass.

Referring to Figure 3 which illustrates a modification of the invention in which a sheet of plastic, resilient material is interposed directly between the porous outer surface of a block of cellular glass and an outer sheet of non-porous, vitreous material. A block 16 of cellular glass is formed with a plurality of spaced recesses 17 to improve the insulating properties of the unit. A sheet of asphalt 18 is placed between the recessed surface of the block 16 and the inner surface of a sheet of non-porous, vitreous material 19. The entire assembly is united by the application of heat and pressure thereto, as described above in connection with the embodiment of the invention shown in Figures 1 and 2.

Referring to Figure 4, which illustrates a modification of the invention wherein a sheet of resin is utilized as the sole waterproof, spacing means between the porous surface of a block of cellular glass and the outer sheet of non-porous material. A block 20 of cellular glass having a porous outer surface has a sheet of plastic synthetic resin 21, of the types enumerated above in connection with Figures 1 and 2, placed between its outer surface and the inner surface of a sheet 22 of non-porous, vitreous material. The cellular glass block, resin sheet, and vitreous sheet are then united, as indicated above, by the application of heat and pressure thereto.

In the several figures of the drawing, it will be understood that the outer sheets 15, 19, and 22 of non-porous, vitreous material may be formed of any suitable material such as glazed cellular glass, a glass plate, dense cellular glass, or a composition stone. If metal foil is used, it may be adhered to the outer sheets 15, 19, and 22 with asphalt or the like and the foil may be adhered to cellular glass with the same or a different adhesive. In any case, the adhesive used should remain plastic so that it will bond the separate elements together over a wide temperature range. It is also desired that the adhesive material be so treated that it will remain resilient and form a permanent cushioning layer which will not only absorb shocks or impacts against the outer sheet but at the same time will compensate for any differences in the coefficients of thermal expansion exhibited by the several parts of the unit. If no metal foil or sheet metal is used, the adhesive layer interposed between the surface of the block of cellular glass and the outer layer of non-porous material should be a material which will remain plastic and non-shattering so that a crack in the outer layer of non-porous material will not be communicated to the cellular glass block.

The foregoing detailed description has been given for clearness of understanding only and no limitations should be imposed upon the appended claims which should be construed as broadly as permissible in view of the prior art.

What I claim is:

1. A building unit comprising a base of cellular glass having a sheet of protecting vitreous veneer on one side thereof, an interposed water-impervious film between said cellular base and said sheet of veneer, and interposed films of resilient adhesive material adhering one surface of the impervious film to the veneer and adhering the other surface of the film to the outer surface of the cellular glass base.

2. A building unit comprising a base of cellular glass having a sheet of protecting vitreous veneer on one side thereof, an interposed metallic sheet between the surfaces of said cellular base and said sheet of veneer, and interposed films of non-shatter, resilient, adhesive material adhering one surface of the metallic sheet to the veneer and adhering the other surface of the sheet to the outer surface of the cellular glass base.

3. A building unit comprising a base of cellular glass having a plurality of spaced recessed portions in one surface thereof, a sheet of protecting vitreous veneer covering said recessed portions and forming therewith a plurality of dead air chambers, and an interposed sheet of asphalt between said cellular glass base and said sheet of veneer adhesively securing the veneer to the base.

4. A building unit comprising a cellular glass body having a porous outer surface, a sheet of non-porous decorative material covering said porous surface, and an interposed sheet of synthetic resin between said porous outer surface and said sheet of decorative material cementing them together.

5. A building unit comprising a cellular glass body having a porous outer surface, a glass plate covering said porous surface, and an interposed sheet of synthetic resin between said porous outer surface and said glass plate cementing them together.

6. A building unit comprising a cellular glass body, and a plurality of layers of protective covering adhering to said body and to one another to form a composite structure, the outer layer being in the form of a vitreous veneer and an intermediate layer being in the form of an adhesive plastic material.

WILLIAM O. LYTLE.